Oct. 23, 1923.
W. B. NEWKIRK
METHOD OF MAKING GRAPE SUGAR
Filed Nov. 16, 1922
1,471,347
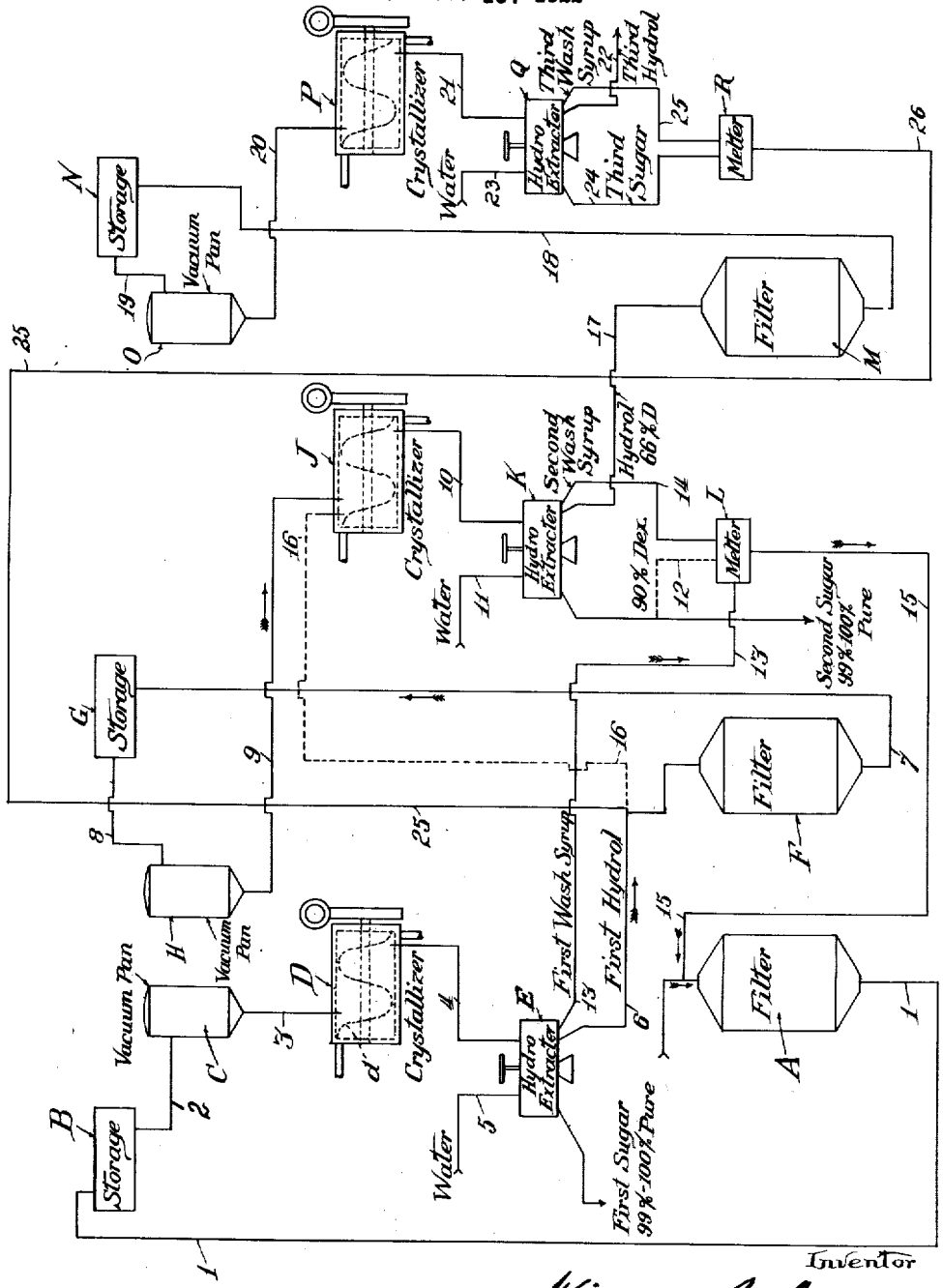
Inventor
William B. Newkirk
by Barnett Kluman
Attorneys Patented Oct. 23, 1923.

1,471,347

UNITED STATES PATENT OFFICE.

WILLIAM B. NEWKIRK, OF EDGEWATER, NEW JERSEY, ASSIGNOR TO CORN PRODUCTS REFINING COMPANY, A CORPORATION OF NEW YORK.

METHOD OF MAKING GRAPE SUGAR.

Application filed November 16, 1922. Serial No. 601,302.

*To all whom it may concern:*

Be it known that I, WILLIAM B. NEWKIRK, a citizen of the United States, residing at Edgewater, in the county of Bergen and State of New Jersey, have invented certain new and useful Improvements in Methods of Making Grape Sugar, of which the following is a specification.

My invention is concerned with the manufacture of grape sugar (dextrose) from starch or starch bearing materials and relates, more particularly, to the crystallization of the dextrose in the converted liquor and the separation of the sugar from the mother liquor in a crystalline state and substantially free from impurities.

The object of the invention is to make possible the production, on a commercial scale and by methods which are economically feasible, of a crystalline dextrose which will be to all intents and purposes pure (99 to 100% dextrose calculated on the basis of dry substances).

It has long been customary to make a solid sugar from starch by converting the starch, concentrating the converted liquor, pouring this liquor into molds, or casting on a floor, and allowing the same to stand until hard and then curing the blocks of sugar by heat and pressing or centrifuging the material to extract the mother liquor commonly called "hydrol" in the trade. One of the disadvantages of this method is that the sugar contains quite a large percentage of unconverted dextrines, protein substances and other impurities, the purity being in no case, so far as I am aware, greater than 95%. Moreover, the process consumes a long period of time, requires a large amount of labor, much floor space, and involves a large loss of dextrose which is pressed out with the mother liquor.

I have found that by making quite a radical departure from the method usually employed in the manufacture of grape sugar, a sugar of very close to absolute purity can be produced by a process which is relatively simple and is economically practical. Dextrose or grape sugar of high purity has been made heretofore, but never, so far as I am aware, on a commercial scale by methods which can be regarded as feasible from an economic point of view.

The present process involves, in the first place, the repeated treatment of the converted liquor. That is to say, after crystallization has been induced in the liquor received from the converters and the sugar crystals separated therefrom the mother liquor or hydrol is retreated once, or it may be twice, to produce a second, and, if desired, a third yield of sugar crystals. It has been customary to treat sucrose in a manner somewhat analogous to this, the readiness of the molasses to crystallize naturally suggesting this expedient; but as there seems to be no natural tendency of the hydrol of grape sugar to crystallize, the re-treatment of the converted liquor has not heretofore suggested itself as a workable possibility to manufacturers of this product. The retreatment, obviously, is not essential but it is, nevertheless, I believe, quite necessary, for reasons of economy, in order that the yield of the sugar from a given batch of the converted liquor be sufficient in quantity to warrant the undertaking. The attempt to obtain any very considerable percentage of the dextrose by one crystallizing operation is not feasible because of the length of time required, and also because of the tendency of the liquor to thicken if allowed to stand too long, thereby preventing the separation as between crystals and mother liquor.

In the second place, the conditions (as to temperature and density of the liquor) under which crystallization is induced must be so regulated as to produce crystals of relatively uniform character, otherwise the complete extraction of the hydrol is not possible. Grape sugar may consist of either hydrate or anhydrous crystals or mixtures of both, according to the conditions present during the crystallizing operation. The crystals may be of relatively uniform size or of differing sizes, dependent also upon conditions capable, I have found, of regulation. In order to make it possible to completely extract the hydrol by centrifuging, for example, which is apparently the only feasible method, the crystals must be of one class or the other, hydrate or anhydrous, and of approximately uniform size, the larger the better. Any considerable quantity of small crystals will result in the formation of a dense film in the centrifugal machine which prevents the liquid from being thrown out. While it is possible by my process to make either a hydrate sugar or an anhydrous sugar, dependent upon the temperature maintained during the crystallizing operation, the process should be regulated so as to produce either one type of crystals or the other, not a mixture of both. It should be further regulated so as to insure the formation of crystals of a relatively uniform large size.

Failure of previous experimenters to realize the importance of these considerations accounts for the practical unworkability of many of the processes described in the literature for manufacturing high purity grape sugar. By accident when conditions (unknown in large part to the experimenters) were just right a satisfactory product might be produced. But there was no certainty that another batch treated in apparently the same way would not prove a failure. Obviously manufacture on a commercial scale under these conditions was impossible. Other processes theoretically possible have proved too expensive for commercial utility. Hence a literature disclosing apparently repeated successful solutions of a problem which, as a matter of fact, has not, prior to the present invention, received any really practical solution.

My invention contemplates, as stated, either two successive treatments of the converted liquor or three such treatments. The process involving but two treatments of the converted liquor will be termed the two-boiling process. The process involving three treatments of the converted liquor, that is, two successive treatments of the hydrol, will be termed the three-boiling process.

The accompanying drawing is a diagram illustrating the three-boiling process. It also illustrates incidentally the preferred two-boiling process as well as a certain modification thereof.

Referring to this diagram, the syrup or converted liquor, produced, for example, by the acid hydrolysis of starch in which the conversion is carried as far as possible, say to 90% dextrose (based on dry substances), is first purified, preferably, by being passed through the bone char filter A and is then run, through pipe 1, to storage tank B. This liquor will ordinarily have a density of approximately 30° Baumé. It is conducted through pipe 2 to a vacuum pan C where it is concentrated to a density of from 38° to 45° Baumé. The preferable density is 40° Baumé and, as a matter of fact, the density should be as high as possible so as to shorten the time without running the risk of having the liquor so viscous as to be unworkable in the later stages of the process and without running the risk of having too high a degree of supersaturation which may cause false grain. The tendency of the liquor to become viscous when concentrated is due to the presence of the dextrine and other impurities. Therefore the extent to which concentration can be carried will depend upon the character of the sugar liquors, their purity, the extent to which conversion has been carried, and the nature of the unconverted or partially converted products therein. From the vacuum pan the concentrated liquor is run through pipe 3 into a crystallizing vessel D which consists preferably of a water jacketed vessel having an agitator $d$ therein. The purpose of the agitator is to keep the magma in slow motion during crystallization so as to constantly bring new mother liquor to the growing crystals. Otherwise the crystals as they form will settle to the bottom and the supernatant mother liquor will be likely to throw out false grain. The liquor coming from the vacuum pan will be relatively hot. It may have a temperature approximating 140° Fahrenheit. If hydrate sugar is to be manufactured the liquor in the crystallizer should be cooled down to from 95° to 105° Fahrenheit and should be held at this temperature until the crystallization is completed, an operation requiring ordinarily about thirty hours, but sometimes for a longer period up to sixty hours, depending upon the character of the sugar liquor treated. If the liquor introduced into the crystallizer has a density of 40° Baumé (this and other densities being based upon a temperature of 100° Fahrenheit as is customary in the art), the best temperature during crystallization is 100° Fahrenheit. There is a direct relationship between the temperature of crystallization and the density of the liquor. If the liquor is heavier than 40° Baumé the temperature should be higher. If the density of the liquor is less than 40° Baumé the temperature must be lower. The upper limit of density, however, is fixed by the character of the liquor as above set forth, and it is not practical to use a liquor substantially lighter than 38° Baumé because with the lower temperature the crystallizing operation is much prolonged and this is undesirable for economic reasons, and, second, because of the tendency of the dextrose to form relatively small crystals at the lower temperatures. From the point of view of economy it should be the aim to crystallize at the highest practical density and temperature. All my experience goes to show that in order to obtain satisfactory results crystallization must take place, for hydrate sugar, within the ranges of densities and temperatures given, namely, 38° to 45° Baumé and 95° to 105° Fahrenheit. The cooling of the liquor is accomplished preferably by circulating cold water through the water jacket of the crystallizer. The reason for artificial cooling is that at the high temperatures anhydrous dextrose might be formed, so that it is desirable to cool the solution down to the temperature favorable for hydrated sugar as quickly as possible. When the liquor has been reduced to the desired temperature it is important to maintain it at approximately that temperature until the crystallization is complete. If the grape sugar liquor is merely allowed to stand until it cools it will become solid or semi-solid as it crystallizes and the crystals, moreover, will be a mixture of hydrate and anhydrous crystals of various sizes. Under such conditions the complete removal of the hydrol from the sugar is impossible.

After crystallization has taken place the material is introduced into a centrifugal machine or hydro extractor E through pipe 4 and the mother liquor or hydrol extracted by centrifugal action. The sugar may be washed by water from pipe 5 and will be found to contain from 99% to 100% of dextrose, calculated on dry substances and not counting the water of crystallization.

The hydrol from the hydro extractor E (first hydrol) is then, preferably, run through pipe 6 to the filter F and from there through pipe 7 to storage tank G from which it is drawn through pipe 8 into a second vacuum pan H. The first hydrol contains, of course, a smaller dextrose content than the original converted liquor. It may contain, for example, 82% of dextrose. Its density has been decreased by extraction of a part of its sugar. The purpose of re-boiling the hydrol is to increase its density. Preferably it is concentrated to a density of from 38° to 42° Baume'. Here again the concentration should be carried, for economic reasons, as high as possible but inasmuch as the hydrol will contain a larger percentage of dextrine and other impurities than the original converted liquor and has a higher viscosity, it is not desirable to concentrate the liquor in vacuum pan H to as high a point as the original converted liquor concentrated in vacuum pan C. The concentrated liquor from vacuum pan H is run through pipe 9 to a second crystallizer J, preferably identical with crystallizer D. The liquor is cooled to from approximately 90° to 100° Fahrenheit, depending upon density, and is held at this temperature until crystallization is complete. The material is then run through pipe 10 to a second hydro extractor K which expels the mother liquor leaving the crystals in the basket. This sugar may be washed with water from pipe 11. I have found it possible, by the exercise of some care, to produce a "second sugar", that is, sugar taken from hydro extractor K, which will be substantially as pure as sugar from the hydro extractor E. If, however, the second sugar is not of the required purity, which may happen in case the percentage of dextrose in the hydrol is low, or if the non-sugars do not wash out readily, the sugar from hydro extractor K may be introduced by conveyor 12 into the melter L to which is preferably run, through pipe 13, the wash syrup from hydro extractor E (first wash syrup) and through pipe 14, the wash syrup from hydro extractor K (second wash syrup). The melted sugar is conducted through pipe 15 to filter A where it is mixed with the next batch of converted liquor.

In the two-boiling process above described, the hydrol from hydro extractor K (second hydrol) receives no further treatment. It is a marketable commodity of some but small value.

The process as above outlined may be modified in the following respect. Instead of filtering and concentrating the first hydrol this liquor may be conducted directly, through pipe 16, indicated by the dotted line on the diagram, to crystallizer J. The liquor being relatively light, crystallization takes place slowly which is a disadvantage. The modified arrangement, however, has the compensating advantage of eliminating the expense of the filtering and re-boiling steps.

For the three-boiling process the hydrol extracted by hydro extractor K (second hydrol) is conducted through pipe 17 to the filter M and is then run through pipe 18 to the storage tank N and from the storage tank through pipe 19 to the third vacuum pan O. The liquor is here concentrated as highly as its increased viscosity and diminished purity due to the increased percentage of dextrine, etc. will permit, ordinarily to a density varying from 36° Baume' to 40° Baume'. It is then run through pipe 20 to a third crystallizer P where its temperature is reduced to from 90° to 100° Fahrenheit and held at that point until crystallization is complete. The material is then introduced through pipe 21 into a hydro extractor Q where the hydrol is drawn off and is carried out of the process through pipe 22 (third hydrol). The sugar in the hydro extractor is washed by water introduced through pipe 23 and this sugar (third sugar) is carried by conveyor 24 to a melter R into which is introduced through pipe 25 the wash syrup (third wash syrup) from hydro extractor Q. The melted sugar passes through pipe 26 into the filter F where it mixes with the first hydrol. It is sometimes possible to obtain a third sugar of sufficiently high purity for the market. But ordinarily it requires retreatment as described.

The crystallization of the dextrose is facilitated by seeding which may be accomplished by leaving a small amount of sugar in the crystallizer as each batch is with-drawn therefrom. In fact the seeding of the liquor with hydrate or anhydrous crystals, according to the type of sugar to be manufactured, such crystals being conveniently taken from the batch just made previously, has an important bearing on the matter of obtaining uniformity of crystallization throughout the magma. It has been pointed out that by proper control of the temperature during crystallization one type of crystals or the other, that is, hydrate or anhydrous crystals can be produced. By inducing crystallization through seeding instead of allowing the crystals to form spontaneously, these crystals will all be substantially uniform in size. With the crystals of the same type and of uniform size purging is made practical. It is not practical when the crystals are of diverse type and different sizes. The process of manufacturing anhydrous sugar, as herein disclosed, is the subject matter of a copending application, filed by me on the 28th day of May, 1923, Serial No. 641,886.

The connections between the various elements of the apparatus have been referred to as pipes. It will be understood that any suitable conduit or conveyor might be used for moving the material from place to place. The invention is not concerned with the particular form of apparatus illustrated diagrammatically in the drawing. It would be possible, for example, to crystallize the concentrated liquor in the vacuum pan but as a matter of practice it is more convenient to employ a separate crystallizing vessel.

In order to produce an anhydrous sugar the converted liquor, after having been concentrated, as above described, in connection with the production of hydrate sugar and introduced into the crystallizer D, is cooled down to a temperature of from 110° to 120° Fahrenheit, depending upon its density, the preferable density being 41° Baumé and the preferable temperature 115° Fahrenheit. The material is held at this temperature until crystallization takes place. The first sugar from this process will be, as stated, anhydrous sugar, but if the hydrol is retreated the second and third sugars will be hydrate sugars. I do not claim herein, specifically, the manufacture of anhydrous sugar. The process herein disclosed is applicable, in a generic sense, to the production of both kinds of sugar and is so claimed. The specific claims hereof are, however, limited to the production of hydrated sugar.

It is realized that even with the fullest disclosure of the invention perfectly satisfactory results are obtainable only by the exercise of some discretion on the part of the operator so far as concerns the densities of the liquor in which crystallization is induced and the temperatures at which crystallization should take place. The character of the converted liquor will differ in different plants and even when much care is exercised with different batches in the same establishment. The aim should be to concentrate the liquor as highly as possible but the degree of workable concentration will depend upon the character of the particular batch. The temperature of the concentrated liquor should be reduced as quickly as possible at least in the manufacture of the hydrated product, to the temperature at which crystallization is designed to be brought about and the batch maintained substantially at that temperature during the period of crystallization. While it is not possible to state to a degree the exact temperatures to be employed for hydrate and anhydrous sugars respectively, since temperature will depend upon density and density upon the character of the converted liquor, the density and temperature should be regulated within the limits above indicated so as to produce either hydrate crystals or anhydrous crystals and not a mixture of both. Most attempts to make a high purity sugar have failed because the importance of this was not realized.

It will be apparent from the foregoing considerations that while I have described my invention in what I consider its most desirable form, I realize fully that the preferred method above outlined may be modified without departure from the principles of the invention and will doubtless have to be modified according to varying characteristics of the converted liquor treated. I wish it to be understood, therefore, that the invention is not limited to the specific details of the process as described, except so far as such details are expressly made limitations in the appended claims. While I have stated the ranges of temperature and density which I consider best, it may be possible by exercise of unusual care to work above or below said temperatures or to use higher or lower densities with the risk, however, of false grain and mixed grains and other difficulties which have been suggested.

I claim:

1. The process of obtaining grape sugar in a crystalline state from a dextrose solution produced by conversion of starch which comprises concentrating the solution to super-saturation by heating in vacuo, cooling the solution to and holding the same at a crystallizing temperature, separating the mother liquor from the dextrose crystals, subjecting the mother liquor to a crystallizing temperature at a corresponding density substantially as specified for a second yield of crystals, and thereafter making a separation between the mother liquor and the crystals last formed therein.

2. The process of claim 1 in which the mother liquor obtained from the first separating operation is concentrated by heating in vacuo and cooled down to the crystallizing temperature for production of the second yield of crystals.

3. The process of claim 1 involving additionally concentrating the mother liquor derived from the second separating operation and thereafter cooling said mother liquor to and maintaining the same at a crystallizing temperature for production of a third yield of crystals.

4. The process of claim 3 involving additionally melting the third yield of sugar and adding it to a batch of converted liquor to be subsequently treated in accordance with the claimed process.

5. The process of claim 3 involving additionally melting the third yield of sugar and mixing it with the mother liquor derived from the first separation, in the treatment according to the claimed process of a subsequent batch of the converted solution.

6. The process of claim 1, in which the converted solution is concentrated to a density of from 38° to 45° Baumé and its temperature maintained during crystallization at between 95° and 105° Fahrenheit.

7. The process of claim 1, in which the converted solution is concentrated to a density of from 38° to 45° Baumé, and its temperature maintained during crystallization at between 95° and 105° Fahrenheit for, approximately, from 30 to 60 hours.

8. The process of claim 1, in which crystallization is induced by the introduction into the magma of previously formed dextrose crystals of the same type as those intended to be grown.

9. The process of manufacturing grape sugar in a crystalline state from a dextrose solution produced by conversion of starch which comprises concentrating the solution to a density of from 38° to 45° Baumé, and obtaining a plurality of yields of sugar from the solution by holding the same at a temperature of from 90° to 105° Fahrenheit and by intermittently centrifuging the liquor during the crystallizing operation.

10. The process of obtaining two yields of pure grape sugar (99% to 100% dextrose) from a dextrose solution produced by conversion of starch, which consists in super-saturating said solution by heating in vacuo, cooling the solution and holding it at a crystallizing temperature, centrifuging the solution to separate the crystals from the mother liquor, subjecting the mother liquor to a crystalizing temperature and at a corresponding density for a second yield of crystals, and centrifuging the same to separate the second yield from the liquor.

11. The process of claim 10, in which the converted liquor is concentrated to a density of between 38° and 45° Baumé and the crystallization temperature maintained at from 90° to 105° Fahrenheit.

12. The process of claim 10, involving additionally the concentration, by heating in vacuo, of the mother liquor derived from the first centrifuging operation.

13. The process of obtaining a hydrate crystalline grape sugar from a dextrose solution produced by conversion of starch, which comprises concentrating the converted solution to a density of from 38° to 45° Baumé, seeding with hydrate dextrose crystals and cooling and holding the solution at a temperature of from 95° to 105° Fahrenheit, and separating the mother liquor from the dextrose crystals.

14. The process of claim 13, in which the converted solution is artificially and quickly cooled to the temperature at which crystallization takes place.

15. The process of obtaining grape sugar in a crystalline state from a dextrose solution produced by the conversion of starch which comprises concentrating the solution to a density and cooling the same to and holding it at a temperature, in the presence of previously formed crystals of a single type, to induce formation of crystals in the solution which are substantially all of a said type and of substantially uniform size, and keeping the solution in slow motion during the crystallizing operation.

16. The process of obtaining a hydrate crystalline grape sugar from a dextrose solution produced by conversion of starch, which comprises heating the converted solution in vacuo to concentrate the same to a density of from 38° to 45° Baumé, seeding with hydrate dextrose crystals and quickly cooling the solution to a temperature of from 95° to 105° Fahrenheit, holding the same at that temperature for approximately from 30 to 60 hours, and centrifuging the solution to separate the mother liquor from the dextrose crystals.

17. The process of obtaining grape sugar in a crystalline state from a dextrose solution produced by the conversion of starch which comprises concentrating the solution to super saturation by heating in vacuo, cooling the solution to and holding the same at a crystallizing temperature, centrifuging the magma to separate the mother liquor (first hydrol) from the dextrose crystals (first sugar), concentrating the first hydrol to supersaturation by heating in vacuo, cooling the concentrated hydrol to and holding the same at a crystallizing temperature, and centrifuging the magma to separate the mother liquor (second hydrol) from the dextrose crystals (second sugar).

18. The process of claim 17 in which the converted liquor is concentrated to a density of between 38° Baumé and 45° Baumé and cooled, for crystallization, to a temperature between 95° Fahrenheit and 105° Fahrenheit, and the first hydrol is concentrated to a density of between 38° Baumé and 42° Baumé, and is cooled for crystallization to a temperature of between 90° Fahrenheit and 100° Fahrenheit.

19. The process of claim 18 in which the first sugar is washed with water and the second sugar melted and the wash water from the first sugar, together with the melted second sugar, introduced into a fresh batch of converted liquor for treatment as above set forth.

20. The process as specified in claim 18 comprising additionally concentrating in vacuo the second hydrol to a density of from 36° Baumé to 40° Baumé, and reducing the temperature of the concentrated liquor to and holding the same at a temperature between 90° Fahrenheit and 100° Fahrenheit, and centrifuging the material to separate the mother liquor (third hydrol) from the dextrose crystals (third sugar).

21. The process of obtaining a hydrate crystalline grape sugar from a dextrose solution produced by the conversion of starch, which comprises concentrating the converted solution to a density, and artificially cooling the same down to a temperature favorable to the formation of hydrate crystals and holding the solution at said temperature in the presence of previously formed hydrate dextrose crystals.

22. The method of obtaining grape sugar having a purity of between 99% and 100% from a converted starch liquor which consists in concentrating the liquor to a density and cooling the same to a temperature to bring about growth of crystals of a single type only, maintaining the magma at said temperature and in the presence of previously formed crystals of said type, while keeping it in motion to cause the formation of crystals of substantially uniform size, then centrifuging the magma to eliminate mother liquor.

23. The method of obtaining a hydrate crystalline grape sugar from a dextrose solution produced by the conversion of starch which comprises concentrating the converted solution to supersaturation by heating, quickly cooling the solution down through the temperatures favorable to the production of anhydrous crystals to a temperature favorable to the production of hydrate crystals holding same at the latter temperature until crystallization takes place, and afterward separating the mother liquor from the crystals.

24. The method of obtaining a hydrate crystalline grape sugar from a dextrose solution produced by the conversion of starch which comprises concentrating the converted solution to supersaturation by heating, quickly cooling the solution down through the temperatures favorable to the production of anhydrous crystals to a temperature favorable to the production of hydrate crystals, holding the same at the latter temperature and in motion in the presence of previously formed hydrate crystals until crystallization takes place, and afterward separating the mother liquor from the crystals.

WILLIAM B. NEWKIRK.

Certificate of Correction.

It is hereby certified that the State of Incorporation of the assignee in Letters Patent No. 1,471,347, granted October 23, 1923, upon the application of William B. Newkirk, of Edgewater, New Jersey, for an improvement in "Methods of Making Grape Sugar," was erroneously given as "New York," whereas said State should have been given as *New Jersey*, as shown by the records of assignments in this office; and that the said Letters Patent should be read with this correction therein that the same may conform to the record of the case in the Patent Office.

Signed and sealed this 27th day of November, A. D., 1923.

[SEAL.]

KARL FENNING,
*Acting Commissioner of Patents.*